United States Patent [19]
Matsubara et al.

[11] Patent Number: 6,131,145
[45] Date of Patent: *Oct. 10, 2000

[54] INFORMATION PROCESSING UNIT AND METHOD FOR CONTROLLING A HIERARCHICAL CACHE UTILIZING INDICATOR BITS TO CONTROL CONTENT OF PREFETCHING OPERATIONS

[75] Inventors: Kenji Matsubara, Tokyo; Toshihiko Kurihara; Hiromitsu Imori, both of Hadano, all of Japan

[73] Assignee: Hitachi, Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/738,912

[22] Filed: Oct. 28, 1996

[30] Foreign Application Priority Data

Oct. 27, 1995 [JP] Japan ................................. 7-280836

[51] Int. Cl.⁷ ............................. G06F 9/38; G06F 12/00; G06F 13/00
[52] U.S. Cl. ......................... 711/137; 711/122; 711/204; 712/207
[58] Field of Search ..................................... 711/137, 122, 711/156, 204; 395/383, 584; 712/237, 207

[56] References Cited

U.S. PATENT DOCUMENTS

| | | | |
|---|---|---|---|
| 5,146,578 | 9/1992 | Zangenehpour | 711/137 |
| 5,377,336 | 12/1994 | Eickemeyer et al. | 712/207 |
| 5,652,858 | 7/1997 | Okada et al. | 711/137 |
| 5,680,637 | 10/1997 | Hotta et al. | 712/24 |

OTHER PUBLICATIONS

Chi et al, "Reducing Data Access Penalty Using Intelligent Opcode Driven Cache Prefetching," Proceedings Int'l Conf. on Computer Design: VSLI in Computers and Processors, IEEE Comput. Soc. Press, pp. 512–517 (Conf. date Oct. 2–4, 1995).

Chi et al, "Compiler Driven Data Cache Prefetching for High Peformance Computers," Proceedings of 1994 IEEE Region 10's Ninth Annual Int'l. Conf., Aug. 22–26, 1994, pp. 274–278, vol. 1.

Proceedings of 4th International Conference on Architectural Support for Programming Languages and Operating Systems, "Software Prefetching", D. Callahan, et al., Apr. 1991, pp. 40–52.

*Primary Examiner*—Glenn Gossage
*Attorney, Agent, or Firm*—Antonelli, Terry, Stout & Kraus, LLP

[57] ABSTRACT

An information processing unit and method for controlling a cache according to a software prefetch instruction, are disclosed. Indicator or indication bits are provided for indicating a hierarchical level of a cache to which an operand data is to be transferred or a quantity of an operand data to be transferred, or both. The indication bits are provided in a software prefetch instruction such that at the time of a transfer of block data or line data, a required data is transferred to a cache based on the indication bits in the prefetch instruction. Thus, it is not necessary to change the timing for executing a software prefetch instruction depending on which one of the caches of the hierarchical levels is hit, and a compiler can generate an instruction sequence more easily.

10 Claims, 8 Drawing Sheets

| VALUE OF PF BITS | SOFTWARE PREFETCH OPERATION |
|---|---|
| 0 | NOTHING (SAME AS PRIOR-ART TECHNIQUE) |
| 1 | TRANSFER 128 BYTES FOR ONE LINE FROM THE MAIN MEMORY TO BOTH PRIMARY CACHE AND SECONDARY CACHE |
| 2 | TRANSFER 32 BYTES FOR ONE BLOCK FROM THE SECONDARY CACHE TO THE PRIMARY CACHE |
| 3 | TRANSFER 128 BYTES FOR ONE LINE FROM THE MAIN MEMORY TO ONLY THE SECONDARY CACHE |
| 4 | TRANSFER 512 BYTES FOR FOUR LINES FROM THE MAIN MEMORY TO ONLY THE SECONDARY CACHE |
| ⋮ | ⋮ |

FIG.3

| VALUE OF PF BITS | SOFTWARE PREFETCH OPERATION |
|---|---|
| 0 | NOTHING (SAME AS PRIOR-ART TECHNIQUE) |
| 1 | TRANSFER 128 BYTES FOR ONE LINE FROM THE MAIN MEMORY TO BOTH PRIMARY CACHE AND SECONDARY CACHE |
| 2 | TRANSFER 32 BYTES FOR ONE BLOCK FROM THE SECONDARY CACHE TO THE PRIMARY CACHE |
| 3 | TRANSFER 128 BYTES FOR ONE LINE FROM THE MAIN MEMORY TO ONLY THE SECONDARY CACHE |
| 4 | TRANSFER 512 BYTES FOR FOUR LINES FROM THE MAIN MEMORY TO ONLY THE SECONDARY CACHE |
| ⋮ | ⋮ |

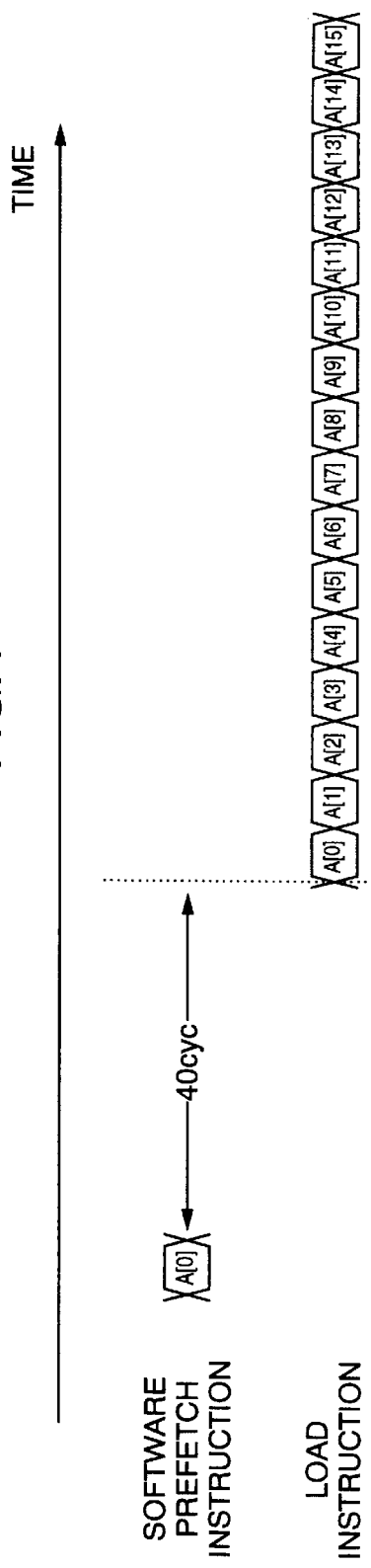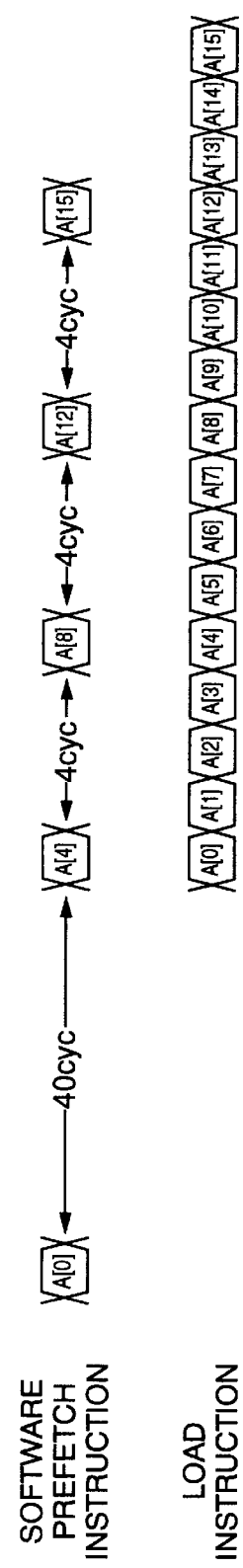

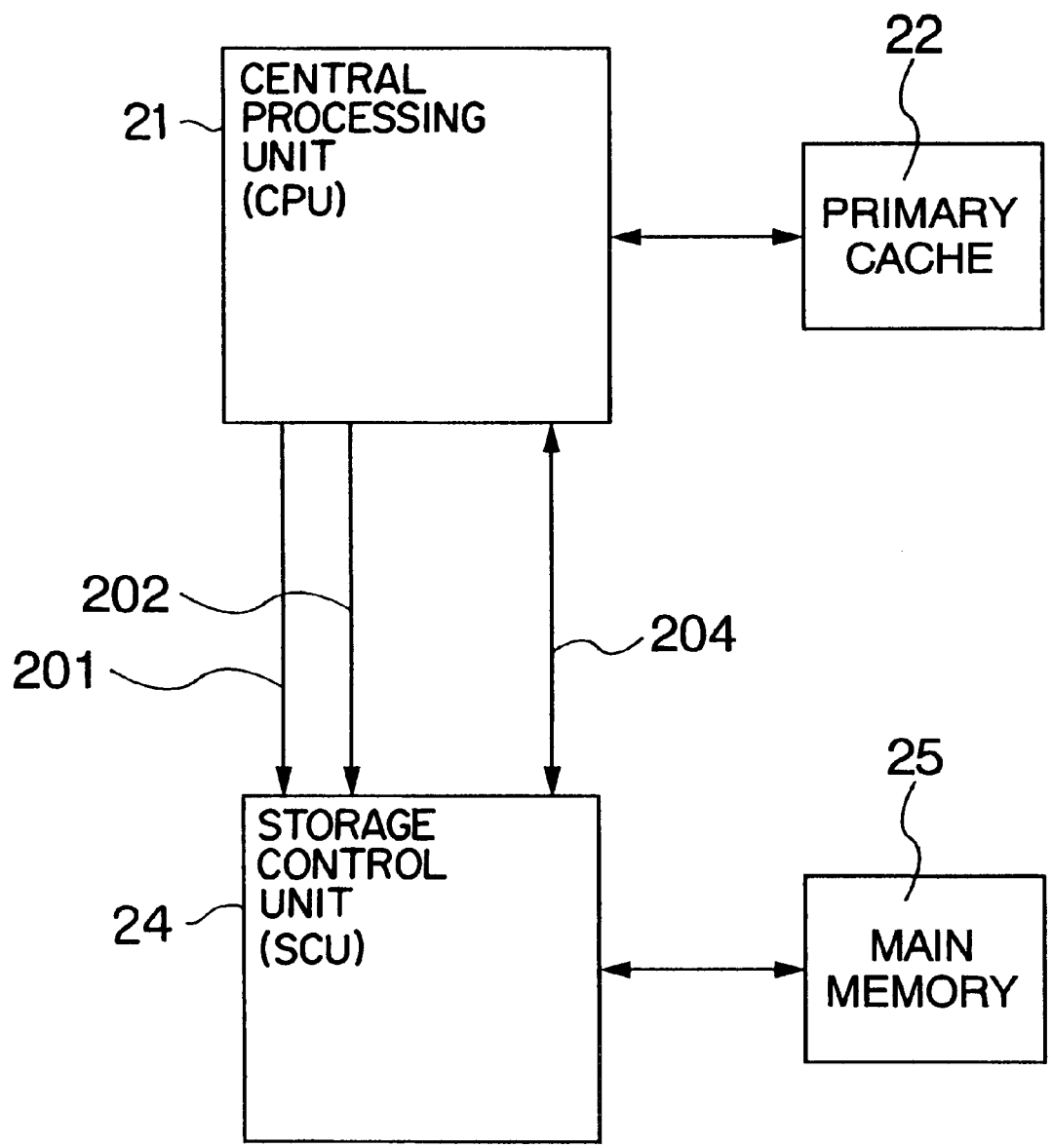

INFORMATION PROCESSING UNIT AND METHOD FOR CONTROLLING A HIERARCHICAL CACHE UTILIZING INDICATOR BITS TO CONTROL CONTENT OF PREFETCHING OPERATIONS

BACKGROUND OF THE INVENTION

The present invention relates to an information processing unit having a hierarchical cache structure, and relates more particularly to an information processing unit equipped with a software prefetch instruction which can reduce an overhead due to a cache miss by transferring in advance, from a main memory to a cache, an operation data to be used for an operation.

In general, an information processing unit having a cache reads an operation from a main memory and uses it when the operation referred to by an instruction does not exist in the cache or when a cache miss has occurred. Usually, a reading of this operation takes numerous times (several times or dozens of times that of the time required for a cache access. Accordingly, an information processing unit of this type has a problem in that when a cache miss has occurred, an execution of a succeeding instruction is delayed until an operation has been read from the main memory. Thus, the execution time of the information processing unit is extended, thereby restricting the performance of the information processing unit.

For solving the above-described problem, there is a technique which is known for transferring in advance from main memory to a cache an operation data to be used in the future and for reducing the penalty of a cache miss by achieving a cache hit at the time when the operation data is used. Research on a software prefetch instruction for achieving this has been carried out and a result of this study is being used in various information processing units.

As a conventional technique relating to the software prefetch instruction, a technique described in the following paper, for example, is known: Callahan, D, Kennedy, K. Porterfield, A., "Software Prefetching", Proceedings of the 4th International Conference on Architectural Support for Programming Languages and Operating Systems, April 1991, pp. 40–52.

The operation of the software prefetching instruction by an information processing unit according to the conventional technique will be explained below with reference to drawings.

FIG. 5 is a block diagram for showing an example of the configuration of the information processing unit according to the conventional technique, and FIGS. 6A and 6B are time charts for explaining a processing operation according to a presence or absence of a software prefetch. In FIG. 5, 21 denotes a CPU (central processing unit), 22 a primary cache, 24 a SCU (storage control unit) and 25 a main memory.

The conventional technique shown in FIG. 5 is an example of the information processing unit having a cache of one hierarchical level, and this information processing unit is structured by a CPU 21 for carrying out an information processing, a primary cache 22, a main memory 25 and an SCU 24 for controlling a writing and reading of information to and from the main memory 25. In this information processing unit, the CPU 21 searches an operation data in the primary cache 22 to refer to the operation data. When a cache miss has occurred, the CPU 21 issues a request for transferring the operation data, to the SCU 24 through a request line 201 and an address line 202. The SCU 24 reads the operation data from the main memory 25 and transfers this data to the CPU 21 through a data line 204. The CPU 21 stores the received operation data in the primary cache 22 and also uses this data for an operation.

The operation of the information processing unit shown in FIG. 5 will be explained next by assuming that the processing of an instruction by the CPU 21 is carried out at five pipeline stages of IF (instruction fetch), D (decoding), E (execution), A (operation access) and W (register writing).

FIG. 6A shows a time chart for the case where instructions 0 to 3 are sequentially inputted to the pipelines and a software prefetching is not carried out, in the information processing unit having the above-described structure.

An example shown in FIG. 6A shows a case where a cache miss has occurred in an operation access of the instruction 1 which is a load instruction. In this case, the processing of the instruction 1 is kept waiting until the operation has been read from the main memory at the stage A for carrying out an operation access, and the processing of the instruction 1 at the stage W is kept waiting until that time. Accordingly, the processings of the instructions 2 and 3 at the stages A and E respectively and the subsequent stages are kept waiting, with a result that all the time required for reading the operation from the main memory appears as a penalty due to the cache miss.

The time chart shown in FIG. 6B shows a case where a software prefetch is carried out. In this case, prior to the execution of the instruction 1 which is a load instruction, a software prefetch instruction designated by an instruction 1' is executed in advance by the time period required for transferring the operation from the main memory. As a result, the instructions 2 and 3 which follow the instruction 1' are executed without being interrupted by proceeding with the processing at the pipeline stages, during the period while the operation is being transferred from the main memory by the instruction 1' according to the software prefetch. By the time when the instruction 1 makes an access to the operation data, the operation data required by this instruction 1 has been stored in the primary cache 22 by the instruction 1' which is the software prefetch instruction, and a cache hit is achieved. Thus, it is possible to reduce a penalty attributable to the cache miss.

FIG. 7 is a block diagram for showing another example of the configuration of the information processing unit according to the conventional technique, and FIGS. 8A and 8B are time charts for explaining a processing operation according to a case where a software prefetch is carried out. In FIG. 7, 23 denotes a secondary cache and all other symbols denote the same items as those in FIG. 5.

The conventional technique shown in FIG. 7 shows an example of the configuration of the information processing unit having caches of two hierarchical levels. This information processing unit has the same structure as that of the conventional technique shown in FIG. 5, except the primary cache 22 is incorporated within the CPU 21 and a secondary cache 23 is provided.

According to the conventional technique shown in FIG. 7, the CPU 21 searches the primary cache 22 at first to refer to an operation data. When the primary cache 22 has a cache miss, the CPU 21 searches the secondary cache 23. If the secondary cache 23 is hit, the operation data is transferred from the secondary cache 23 to the primary cache 22. In the subsequent explanation, this transfer will be called a block transfer and the operation data to be transferred will be called a block.

When a miss occurs in the secondary cache 23, the SCU 24 reads the operation data from the main memory 25 and transfers this data to the CPU 21. In the subsequent explanation, this transfer will be called a line transfer and the data to be transferred will be called a line. Usually, the data quantity of the block is smaller than the data quantity of the line, and at the time of the line transfer, only data of the line is stored in the secondary cache 23 and only data of the block referred to is stored in the primary cache 22.

The operation of the information processing unit shown in FIG. 7 will be explained next by assuming that the processing of an instruction by the CPU 21 is carried out at five pipeline stages of IF (instruction fetch), D (decoding), E (execution), A (operation access) and W (register writing), in a manner similar to that explained above.

FIGS. 8A and 8B show a case where instructions 0 to 3 are sequentially inputted to the pipelines and are processed, in the information processing unit having the above-described structure. FIG. 8A is a time chart of the case for executing a software prefetch instruction for preventing a primary cache miss, and FIG. 8B is a time chart of the case for executing a software prefetch instruction for preventing both the primary cache miss and the secondary cache miss.

Usually, there is a considerably large difference between the number of penalty cycles according to the primary cache miss and the number of penalty cycles according to the secondary cache miss. For example, the primary cache miss has four to five cycles and the secondary cache miss has 30 to 40 cycles. Accordingly, in the information processing unit having the above-described cache structure of two hierarchical levels, a software prefetch instruction for avoiding a primary cache miss in handling an operation data may be executed at least five cycles prior to the execution of the instruction for actually referring to the operation data. However, a software prefetch instruction for avoiding a secondary cache miss in handling an operation data needs to be executed at least forty cycles prior to the execution of the instruction for actually referring to the operation data. Therefore, according to the above-described conventional technique, it is necessary to provide a time interval between the execution of the software prefetch instruction and the execution of the instruction for actually referring to the operation data depending on whether a primary cache miss is to be avoided or a secondary cache miss is to be avoided.

According to the above-described information processing unit of the conventional technique having a cache structure of at least two hierarchical levels, it is necessary to change the timing for executing a software prefetch instruction depending on which one of the caches of the hierarchical levels contains the operation data resulting in a hit in the corresponding cache. Accordingly, the above-described conventional technique has a problem in that a control at the time of a compiler generating a software prefetch instruction becomes complex and it is difficult to sufficiently make use of the effect of the software prefetch instruction.

FIG. 9 is a diagram for showing an address relationship of an array of data which occupies a continuous area of memory which becomes an object of a software prefetch operation, and FIG. 10 is a time chart for explaining an operation of transferring the operation data of the array as shown in FIG. 9 by using a software prefetch instruction.

The above-described problems of the conventional technique will be explained below by assuming that a size of a block is 32 Bytes (B), a size of a line is 128 B, a transfer of the block requires four cycles and a transfer of the line requires forty cycles in the unit shown in FIG. 7.

As an example of using a software prefetch instruction, consider a case of sequentially referring to an array A(i) (i=0, 1, 2, . . .) which occupies a continuous area of memory. When the size of individual data of the array A (i) is 8 B, the relationship of address between the line and the block is as shown in FIG. 9.

Assume that a cache miss occurred in both the primary cache and the secondary cache for all the data of the array A(i) in the initial state. In this case, at first, a software prefetch instruction is executed forty cycles prior to the execution of the instruction for referring to the data of A (0), in order to achieve a line transfer of the data of A (0) from the main memory. By this execution, data of 32 B corresponding to one block, that is the data from A (0) to A (3), is hit in the primary cache. Similarly, data of 128 B corresponding to the line, that is the data from A (0) to A (15), is hit in the secondary cache.

Accordingly, a software prefetch instruction is not necessary to refer to the data from A (1) to A (3) in the processing of the subsequent instructions since these data already exist in the primary cache 22. However, when the data of A (4) becomes necessary, a software prefetch instruction is executed four cycles prior to the execution of the instruction for referring to the data of A (4) in order to carry out a block transfer from the secondary cache, since the data of A (4) exists in only the secondary cache. By this execution, data of 32 B corresponding to one block, that is the data from A (4) to A (7), is hit in the primary cache. Reference to the data from A (8) afterward becomes possible by repeating an issue of a software prefetch instruction similar to the one described above. FIG. 10 shows a time chart of the above-described operation.

As is clear from FIG. 10 and as already explained in FIGS. 8A and 8B, a time interval for executing the software prefetch instructions is not constant but is irregular. This is because the time interval between the execution of the software prefetch instruction for carrying out a line transfer from the main memory and the execution of the software prefetch instruction for carrying out a block transfer from the secondary cache is not consistent.

On the other hand, accessing and operating the data having the above-described array are repeated extremely regularly, and therefore they are usually executed by an instruction sequence structured by a loop according to a branch instruction. When a time interval between the execution of the software prefetch instructions is irregular, it becomes difficult to build these software prefetch instructions into the loop. Further, an instruction for determining whether a line transfer is to be executed or a block transfer is to be executed becomes necessary. Therefore, this instruction incurs an increase in the number of instructions and interrupts an improvement in the performance of the processing unit according to the software prefetch instructions. Further, when all the data of the line are handled by one loop, the number of instructions increases similarly negatively effecting the performance of the processing unit.

SUMMARY OF THE INVENTION

It is an object of the present invention to provide an information processing unit having a cache structure of at least two hierarchical levels which can eliminate the above-described problems of the conventional technique, can provide a software prefetch instruction to help a compiler generate an instruction sequence easily, and can reduce the negative effects on the performance of the information processing unit due to a cache miss.

In an information processing unit having a software prefetch instruction for transferring an operation data to be used for an operation from a main memory to a cache prior to the execution of the operation, the abovedescribed object of the present invention can be achieved by providing one or a plurality of indication bits for indicating the content of a prefetch operation. The indication bits are included in either an operation code or an operation address of the software prefetch instruction. The type oar content of the prefetch operation performed is based on the indication bits.

Further, the above-described object can be accomplished as follows. When the information processing unit is an information processing unit having caches of two hierarchical levels, the above-described indication bits can indicate at least one of a hierarchical level of a cache to which the operation data is to be prefetched, and a quantity of the operation data to be prefetched. The above-described indication bits also can indicate, when a certain quantity of the operation data is to be transferred from the main memory to the secondary cache, operation data of the same quantity is to be prefetched to the primary cache or that operation data or an integer times that of a quantity of data to be transferred by a normal cache access instruction is transferred when executing a software prefetch instruction.

According to the present invention, it is possible to clearly specify a hierarchy of a cache to which data is to be transferred or a size of data to be transferred by using the above-described indication bits when a compiler generates an instruction in the information processing unit having a cache structure of at least two hierarchial levels. Accordingly, it becomes possible to regularly generate software prefetch instructions. Therefore, the present invention can eliminate the necessity of generating instructions for determining an address relation when an instruction sequence is structured by a loop of instructions such as an access of the array of data and an operation performed on the array of data.

Further, according to the present invention, data of a plurality of lines can be transferred at one time by one software prefetch instruction when making an access to the operation data having continuous addresses. Therefore, the number of software prefetch instructions can be reduced.

Furthermore, a compatibility between a set architecture according to the present invention and a set architecture according to the conventional technique can be achieved easily. For example, when a block size is 32 bytes, the lower five bits of the operation address of a software prefetch instruction is never used as an address. When the above-described indications are carried out by using these five bits, the compatibility can be maintained without extending the architecture of an instruction set.

As described above, according to the present invention, a software prefetch instruction can be used effectively, and this can improve the performance of the information processing unit.

BRIEF DESCRIPTION OF THE DRAWINGS

FIG. 3 is a diagram for explaining the operation indicated by an indication bit in an operation address of a software prefetch instruction;

FIG. 4 is a time chart for explaining the operation of a software prefetch instruction according to one embodiment of the present invention;

FIG. 5 is a block diagram for showing an example of the configuration of an information processing unit according to the conventional technique;

FIG. 10 is a time chart for explaining an operation for transferring the operation data shown in FIG. 9 by using a software prefetch instruction.

DESCRIPTION OF THE PREFERRED EMBODIMENTS

One embodiment of the information processing unit according to the present invention will be explained below with reference to the drawings.

Figure 2:
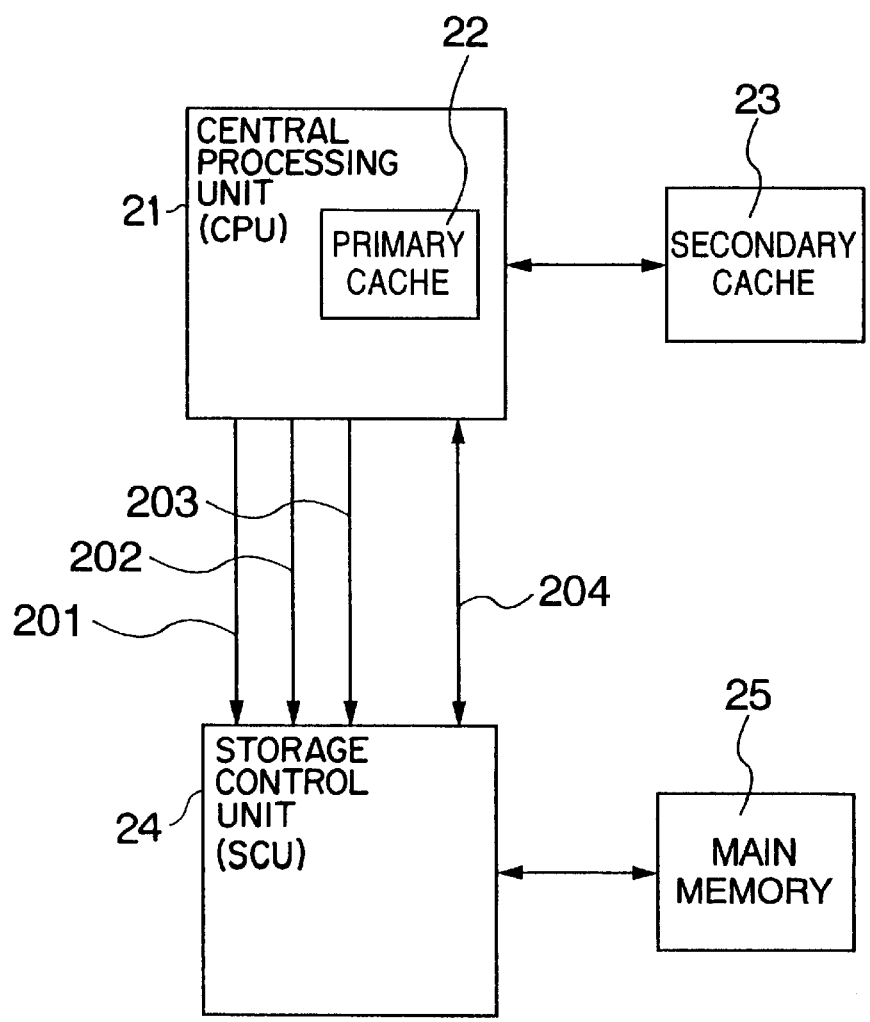
FIG. 2 is a block diagram for showing an example of the configuration of an information processing unit according to one embodiment of the present invention.
Figure 6A:
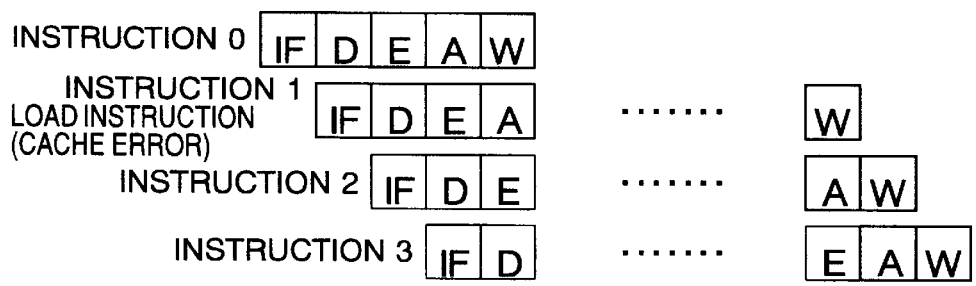
FIGS. 6A and 6B are time charts for explaining a processing operation depending on a presence or absence of a software prefetch.
Figure 6B:
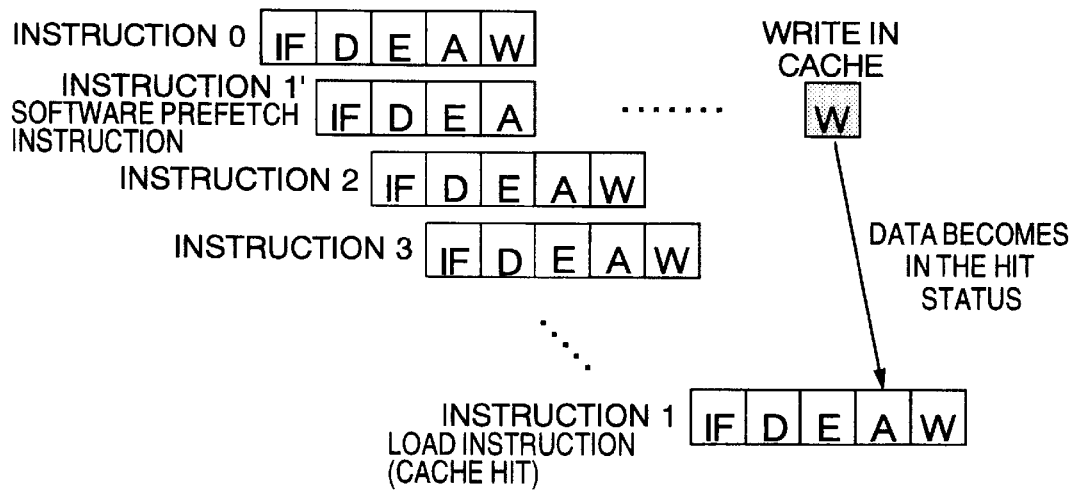
Figure 7:
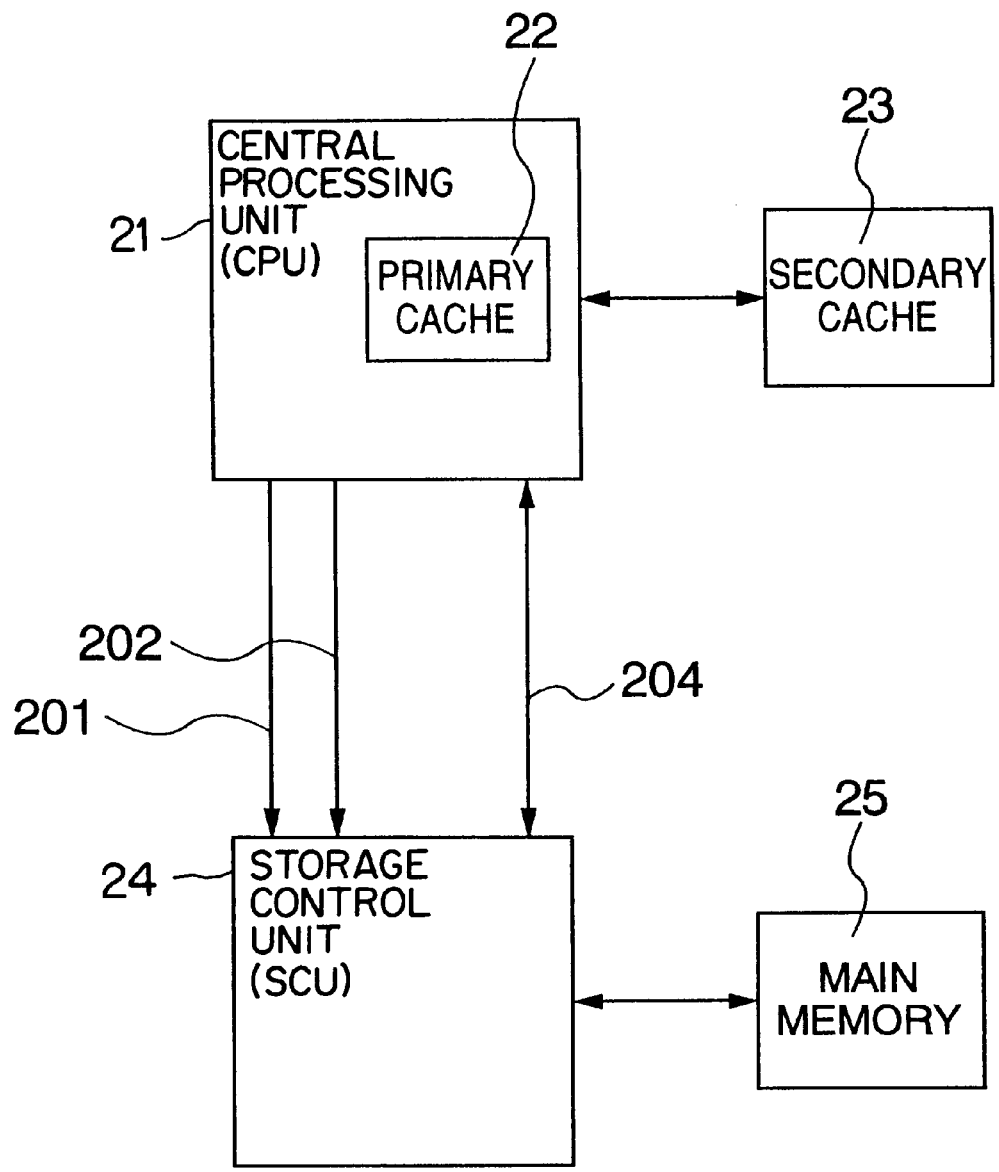
FIG. 7 is a block diagram for showing another example of the configuration of an information processing unit according to the conventional technique.
Figure 8A:
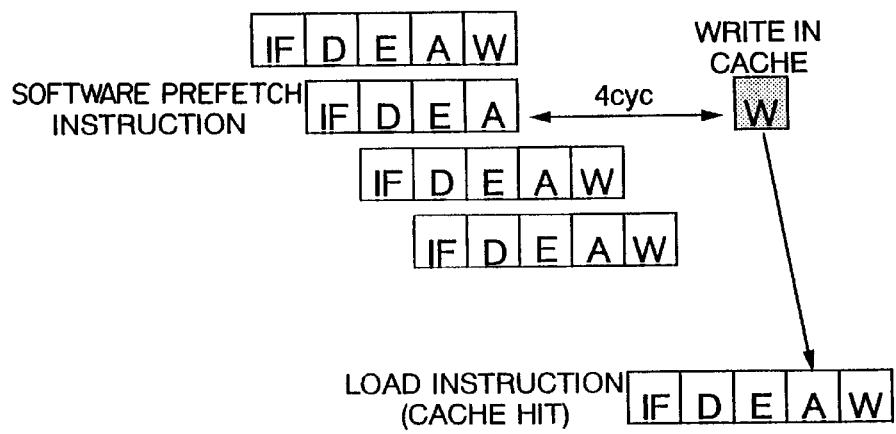
FIGS. 8A and 8B are time charts for explaining processing operation when there is a software prefetch.
Figure 8B:
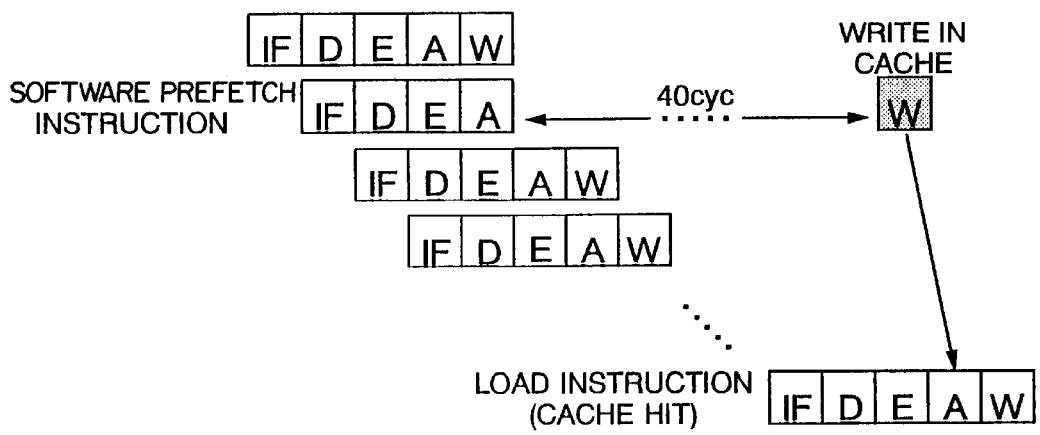

Symbols in FIG. 2 denote the same items as those in FIG. 7.

Figure 1:
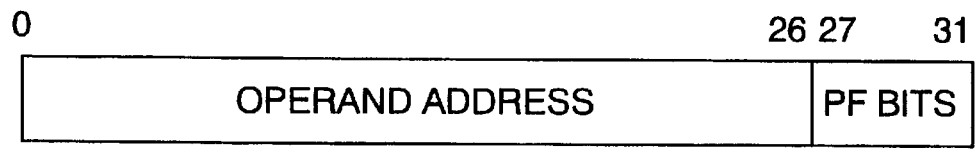
FIG. 1 is a diagram for showing a format of an operation address of a software prefetch instruction according to one embodiment of the present invention.

In one embodiment of the present invention to be described below, it is assumed that a block size of data to be transferred from a secondary cache to a primary cache is 32 B and a line size of data to be transferred from a main memory to the secondary cache is 128 B. In the format of an operation address of a software prefetch instruction shown in FIG. 1, the lower five bits of the operation address are not necessary for a software prefetch instruction since the block size of the operation address is 32 B. Accordingly, the lower five bits are used as bits for indicating the content of a prefetch operation (hereinafter to be referred to as Prefetch (PF) bits) in one embodiment of the present invention.

An example of a correspondence between values of the PF bits in the lower five bits and a software prefetch operation is shown in FIG. 3, and this will be explained below.

When a value of the PF bits is 0, this indicates that a software prefetch is executed in a manner similar to that of the conventional technique. This indication is effective when it is desired to maintain a compatibility with the conventional technique.

When a value of the PF bits is 1, this shows that all the data of the line shown by an operation address is prefetched to the primary cache 22. In the case of a secondary cache hit, 128 B for one line component, that is four blocks, are transferred to the primary cache 22. When a miss occurs in a secondary cache, the corresponding line is line transferred from the main memory 25 and is stored in the primary cache and the secondary cache.

When a value of the PF bits is 2, this shows that a block shown by an operation address is block transferred from the secondary cache 23 to the primary cache 22. When a miss occurs in a secondary cache, the 5 corresponding line is not line transferred from the main memory.

When a value of the PF bits is 3, this shows that a line shown by an operation address is transferred from the main memory 25 to only the secondary cache 23. In other words, when a miss occurs in a secondary cache, the corresponding line is line transferred from the main memory 25 to the secondary cache. The line is not transferred to the primary cache 22.

When a value of the PF bits is 4, this shows that aligned 512 B including a line shown by an operation address, that is four lines, are transferred from the main memory to only the secondary cache.

The operation of a software prefetch instruction in the information processing unit according to one embodiment of the present invention shown in FIG. 2 will be explained next. The information processing unit shown in the drawing to which the present invention is applied is an information processing unit having a cache structure of two hierarchical levels which is the same as the structure of the conventional technique shown in FIG. 7.

In FIG. 2, it is assumed that a software prefetch instruction has been executed and a value of the PF bits of this instruction is 1. In this case, the CPU 21 searches the secondary cache 23 by an operation address. When a hit occurs in the secondary cache, the CPU 21 transfers data of 128 B for one line shown by the operation address from the secondary cache 23 to the primary cache 22. When a miss occurs in the secondary cache 23, the CPU 21 transmits a line transfer request to the SCU 24 through the request line 201, the address line 202 and a PF bit line 203. The SCU 24 reads the data of 128 B for one line from the main memory 25, and transfers this data to the CPU 21 through the data line 204. The CPU 21 stores the received operation data 128 B in the secondary cache and stores all the data of the 128 B in the primary cache 22 as well.

By this operation, it is possible to prefetch all the data of 128 B for one line to the primary cache 22 according to one software prefetch instruction.

Assume that a value of the PF bits is 2. In this case, the CPU 21 searches the secondary cache 23 by an operation address. When a hit occurs in the secondary cache, the CPU 21 transfers data of 32 B for one block shown by the operation address from the secondary cache 23 to the primary cache 22. When a miss occurs in the secondary cache 23, the CPU 21 takes no action. In other words, in this case, the CPU 21 does not send a line transfer request to the SCU 24.

By the above-described operation, it is possible to carry out a block transfer to the primary cache 22 of the operation data prefetched in advance to the secondary cache 23.

Assume that a value of the PF bits is 3. In this case, the CPU 21 searches the secondary cache 23 by an operation address. When a hit occurs in the secondary cache, the CPU 21 takes no action. In other words, in this case, the CPU 21 does not transfer data from the secondary cache 23 to the primary cache 22. When a miss occurs in the secondary cache 23, the CPU 21 transmits a line transfer request to the SCU 24 through the request line 201, the address line 202 and the PF bit line 203. The SCU 24 reads the data of 128 B for one line from the main memory 25, and transfers this data to the CPU 21 through the data line 204. The CPU 21 stores the received operation data 128 B in the secondary cache. In this case, the CPU 21 does not store the data in the primary cache 22.

By the above-described operation, it is possible to prefetch the data from the main memory 25 to the secondary cache 23 without affecting the primary cache.

Assume that a value of the PF bits is 4. In this case, the CPU 21 transmits a line transfer request to the SCU 24 through the request line 201, the address line 202 and the PF bit line 203. The SCU 24 reads data of total 512 B for four lines from the main memory 25, and transfers this data to the CPU 21 through the data line 204. The CPU 21 stores the received operation data 512 B in the secondary cache 23. In this case, the CPU 21 does not store the data in the primary cache 22.

By the above-described operation, it is possible to prefetch all the data of 512 B for four lines which is four times the quantity of data to be transferred by a normal instruction for accessing a cache, from the main memory 25 to the secondary cache 23 by one software prefetch instruction without affecting the primary cache. (The quantity of data need not be four times but any integer times is sufficient.)

In the above-described case where the value of the PF bits is 4, the CPU 21 can also store the data of 512 B in the secondary cache 23 by issuing a four-line transfer request to the SCU 24. By this operation, it is possible to achieve a software prefetch according to the present invention without changing the design of the SCU 24 at all.

FIG. 4 shows a time chart of the software prefetch operation according to the above-described embodiment of the present invention. In this example, it is assumed that four cycles are required for the block transfer and forty cycles are required for the line transfer.

Figure 9:
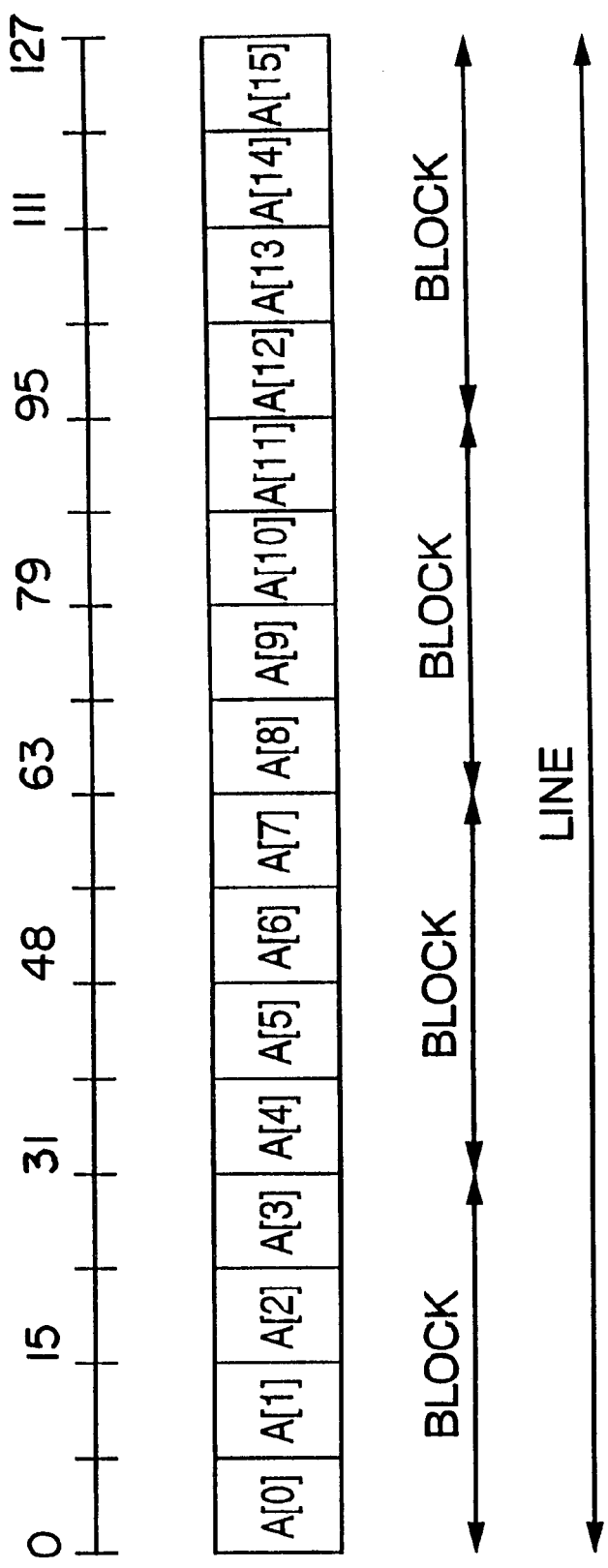
FIG. 9 is a diagram for showing an address relation of an array of data which occupies a continuous area of memory that becomes an object of a software prefetch operation.

As an example of the case for using a software prefetch instruction in the case of making a sequential reference to the array A (i) (i=0, 1, 2, . . .) which occupies a continuous area of memory, with individual data of the array A (i) being 8 B, as explained in the conventional technique, the address relationship between the line and the block is as shown in FIG. 9 as explained already.

The example shown in FIG. 4 is a time chart for prefetching the data of 128 B for one line to the primary cache 22 by assuming 1 for the value of the PF bits in the software prefetch instruction. In this case, the software prefetch instruction is issued forty cycles before the 128 B or 16 array data are accessed each time.

In the above embodiment of the present invention, it has been explained that the PF bits within the software prefetch instruction are provided in the bits that are not used by the operation address of the instruction, and the five types of content of indication by the PF bits have been explained. However, according to the present invention, it is also possible to provide the PF bits in the bits that are not used by the operation code of the instruction, and to have more kinds of indication content.

Further, in the above-described embodiment of the present invention, it has been explained that the present invention is applied to an information processing unit having caches of two hierarchical levels. However, the present invention can also be applied to an information processing unit having caches of more hierarchical levels.

As explained above, according to the present invention, it is possible to clearly indicate a hierarchical level of caches to which data is to be transferred in the software prefetch instruction, and it is also possible to issue software prefetch instructions in a regular time interval. Therefore, it is easy for the compiler to generate an instruction code, and branch instructions for determining an address are not necessary and can be avoided.

Further, according to the present invention, since the quantity of data to be transferred can be set to an integer times the quantity of a line or a block in the software prefetch instruction, a large quantity of data can be transferred by a small number of software prefetch instructions. Further, in the present invention, since the above-described indication bits can be provided at an unused portion of the operation code or at an unused lower bit portion of the operation address in the software prefetch instruction according to the conventional technique, the present invention can keep an architectural compatibility with the conventional technique.

As explained above, according to the present invention, it is possible to effectively improve the performance of an information processing unit using a software prefetch instruction.

What is claimed is:

1. An information processing system, comprising:

a main memory;

a cache; and a processing unit which executes a predetermined software prefetch instruction included as one of a plurality of instructions of a computer program, wherein said predetermined software prefetch instruction, when executed, causes said processing unit to perform a prefetch operation by transferring operand data to be used in a subsequent operation from said main memory to said cache prior to executing said subsequent operation, wherein said predetermined software prefetch instruction includes at least one indication bit for indicating a content of said prefetch operation, said at least one indication bit being included in an operation code or an operand address of said predetermined software prefetch instruction, wherein said cache comprises two hierarchical levels of caches, and wherein said at least one indication bit specifies a hierarchical level of a cache to which said operand data is to be prefetched.

2. An information processing system according to claim 1, wherein said cache comprises:

two hierarchical levels of caches, and wherein said at least one indication bit further specifies that, when a certain quantity of said operand data is transferred from said main memory to a secondary cache, the same quantity of said operand data is to be prefetched to a primary cache.

3. An information processing system according to claim 1, wherein said cache comprises:

two hierarchical levels of caches, and wherein said at least one indication bit further specifies that a quantity of data is to be prefetched in an amount equal to an integer times that of a quantity of data transferred by a cache access instruction other than a software prefetch instruction from said main memory to a secondary cache.

4. A method of controlling a cache in a processing unit according to a predetermined software prefetch instruction included as one of a plurality of instructions of a computer program, said method comprising:

upon execution of said predetermined software prefetch instruction by said processing unit, performing a prefetch operation of transferring operand data to be used in a subsequent operation from a main memory to said cache prior to executing said subsequent operation, wherein said predetermined software prefetch instruction includes at least one indication bit for indicating a content of said prefetch operation, said at least one indicating bit being included in an operation code or an operand address of said predetermined software prefetch instruction, and wherein said at least one indication bit specifies a hierarchical level of a cache to which said operand data is to be prefetched.

5. A method according to claim 4, wherein said cache includes two hierarchical levels.

6. A method according to claim 5, wherein said at least one indication bit further specifies that, when a predetermined quantity of said operand data is transferred from said main memory to a secondary cache, the same quantity of said operand data is to be prefetched to a primary cache.

7. A method according to claim 5, wherein said at least one indication bit further specifies that a quantity of data is to be prefetched in an amount equal to an integer times that of a quantity of data transferred by a cache access instruction other than a software prefetch instruction from said main memory to a secondary cache.

8. A processing unit, comprising:

a cache; and a processor which executes a predetermined software prefetch instruction included as one of a plurality of instructions of a computer program, wherein said predetermined software prefetch instruction, when executed, causes said processor to perform a prefetch operation by transferring operand data to be used in a subsequent operation from a main memory to said cache prior to executing said subsequent operation, wherein said predetermined software prefetch instruction includes at least one indication bit for indicating a content of said prefetch operation, said at least one indicating bit being included in an operation code or an operand address of said predetermined software prefetch instruction, wherein said cache is one of two hierarchical levels of caches, and wherein said content of said prefetch operation to be indicated by said at least one indication bit specifies a hierarchical level of a cache to which said operand data is to be prefetched.

9. A processing unit according to claim 8, wherein said cache is one of two hierarchical levels of caches, and wherein said at least one indication bit further specifies that, when a certain quantity of said operand data to be prefetched is transferred from said main memory to a secondary cache, the same quantity of said operand data is to be prefetched to a primary cache.

10. A processing unit according to claim 8, wherein said cache is one of two hierarchical levels of caches, and wherein said at least one indication bit further specifies that a quantity of data is to be prefetched in an amount equal to an integer times that of a quantity of data transferred by a cache access instruction other than a software prefetch instruction from said main memory to a secondary cache.

* * * * *